(12) United States Patent
Morris et al.

(10) Patent No.: US 11,195,186 B2
(45) Date of Patent: Dec. 7, 2021

(54) METHOD AND APPARATUS FOR MARKETABILITY ASSESSMENT

(71) Applicant: AT&T Intellectual Property I, L.P., Atlanta, GA (US)

(72) Inventors: Nadia Morris, Houston, TX (US); Andrea Basso, Turin (IT); Tara Hines, New York, NY (US); Aleksey Ivanov, Middletown, NJ (US); Jeffrey Mikan, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/538,246

(22) Filed: Aug. 12, 2019

(65) Prior Publication Data

US 2019/0362365 A1 Nov. 28, 2019

Related U.S. Application Data

(63) Continuation of application No. 13/173,839, filed on Jun. 30, 2011, now Pat. No. 10,423,968.

(51) Int. Cl.
*G06Q 30/02* (2012.01)

(52) U.S. Cl.
CPC .................................. *G06Q 30/02* (2013.01)

(58) Field of Classification Search
USPC ............................................... 705/7.11–7.42
See application file for complete search history.

(56) References Cited

U.S. PATENT DOCUMENTS

| 5,794,210 A | 8/1998 | Goldhaber et al. |
| 6,282,713 B1 | 8/2001 | Kitsukawa |
| 6,968,006 B1 | 11/2005 | Puri et al. |
| 7,000,242 B1 | 2/2006 | Haber |
| 7,149,710 B1 | 12/2006 | Edmark |

(Continued)

FOREIGN PATENT DOCUMENTS

| KR | 20030037130 | 5/2003 |
| WO | 200079453 | 12/2000 |

OTHER PUBLICATIONS

Abbe, Alfrieda, "The buzz on social media", The Writer, Mar. 2011, pp. 34-37 and 55 (Year: 2011).*

(Continued)

*Primary Examiner* — Amber A Misiaszek
(74) *Attorney, Agent, or Firm* — Guntin & Gust, PLC; Kenneth Kwan

(57) ABSTRACT

A system that incorporates teachings of the present disclosure may include, for example, a processor operable to determine whether a correlation exists between first products or services consumed by a subscriber leader and second products or services consumed by a plurality of subscriber followers. The first and second products or services can be distributed by a media service provider over a communication system and can be consumed by way of one or more media processors. The processor can be further operable to identify a plurality of market sector classifications for each of the second products or services consumed, to assess a plurality of values of consumption for the plurality of market sector classifications, and to determine a plurality of marketable values for the subscriber leader. Other embodiments are disclosed.

20 Claims, 7 Drawing Sheets

(56) References Cited

U.S. PATENT DOCUMENTS

| | | |
|---|---|---|
| 7,269,643 B2 | 9/2007 | Spaid |
| 7,293,280 B1 | 11/2007 | Gupta |
| 7,444,659 B2 | 10/2008 | Lemmons |
| 7,925,743 B2 | 4/2011 | Neely |
| 8,010,986 B2 | 8/2011 | Bove, Jr. et al. |
| 8,355,955 B1* | 1/2013 | Mirchandani ...... G06Q 30/0641 |
| | | 705/26.1 |
| 8,386,317 B2 | 2/2013 | Brown et al. |
| 8,424,052 B2 | 4/2013 | Abed |
| 8,635,674 B2 | 1/2014 | Bhatia et al. |
| 8,762,850 B2 | 6/2014 | Matz et al. |
| 8,910,201 B1 | 12/2014 | Zamiska et al. |
| 9,113,040 B2 | 8/2015 | Beyabani et al. |
| 9,143,565 B2 | 9/2015 | Hensgen et al. |
| 2002/0083469 A1 | 6/2002 | Jeannin |
| 2002/0162120 A1 | 10/2002 | Mitchell |
| 2003/0020744 A1 | 1/2003 | Ellis et al. |
| 2003/0028873 A1 | 2/2003 | Lemmons et al. |
| 2003/0033192 A1* | 2/2003 | Zyman ................... G06Q 10/06 |
| | | 705/7.36 |
| 2004/0019524 A1 | 1/2004 | Marshall |
| 2004/0116183 A1 | 6/2004 | Prindle |
| 2004/0167814 A1* | 8/2004 | Hawks ................. G06Q 20/201 |
| | | 705/20 |
| 2004/0249700 A1 | 12/2004 | Gross et al. |
| 2005/0021398 A1 | 1/2005 | McCleskey et al. |
| 2005/0229227 A1 | 10/2005 | Rogers |
| 2006/0089843 A1 | 4/2006 | Flather |
| 2006/0090131 A1 | 4/2006 | Kumagai et al. |
| 2006/0230123 A1 | 10/2006 | Simmons |
| 2006/0282319 A1 | 12/2006 | Maggio |
| 2006/0288374 A1 | 12/2006 | Ferris et al. |
| 2007/0089157 A1 | 4/2007 | Clark |
| 2007/0107021 A1 | 5/2007 | Angel |
| 2007/0198510 A1* | 8/2007 | Ebanks ................. G06Q 30/02 |
| 2007/0276726 A1 | 11/2007 | DiMatteo |
| 2008/0002892 A1 | 1/2008 | Jelonek et al. |
| 2008/0015933 A1 | 1/2008 | McKenna et al. |
| 2008/0071594 A1 | 3/2008 | Morin |
| 2008/0098425 A1 | 4/2008 | Welch |
| 2008/0167943 A1 | 7/2008 | O'Neil et al. |
| 2008/0246759 A1 | 10/2008 | Summers |
| 2008/0255961 A1 | 10/2008 | Livesay |
| 2008/0306830 A1* | 12/2008 | Lasa ..................... G06Q 30/02 |
| | | 705/14.16 |
| 2008/1310731 | 12/2008 | Stojancic et al. |
| 2009/0019474 A1 | 1/2009 | Robotham et al. |
| 2009/0048904 A1* | 2/2009 | Newton ................. G06Q 10/10 |
| | | 705/7.29 |
| 2009/0063991 A1 | 3/2009 | Baron et al. |
| 2009/0064219 A1 | 3/2009 | Minor |
| 2009/0089830 A1 | 4/2009 | Chandratillake et al. |
| 2009/0119165 A1 | 5/2009 | Cotgreave et al. |
| 2009/0132342 A1 | 5/2009 | Klinger et al. |
| 2009/0167870 A1 | 7/2009 | Caleca |
| 2010/0058381 A1 | 3/2010 | Begeja et al. |
| 2010/0076851 A1 | 3/2010 | Jewell |
| 2010/0122286 A1 | 5/2010 | Begeja |
| 2010/0131385 A1* | 5/2010 | Harrang ............. G06Q 30/0277 |
| | | 705/26.1 |
| 2010/0138478 A1 | 6/2010 | Meng |
| 2010/0162288 A1 | 6/2010 | Huffman |
| 2010/0179874 A1 | 7/2010 | Higgins et al. |
| 2010/0228631 A1 | 9/2010 | Zhang |
| 2010/0299360 A1 | 11/2010 | Yi et al. |
| 2011/0093336 A1 | 4/2011 | Calabria |
| 2011/0106618 A1 | 5/2011 | Ben-Moshe |
| 2011/0142417 A1 | 6/2011 | Wilson et al. |
| 2011/0219050 A1* | 9/2011 | Ly ..................... G06F 16/24575 |
| | | 707/827 |
| 2011/0251898 A1 | 10/2011 | Scott et al. |
| 2011/0264523 A1 | 10/2011 | Scott et al. |
| 2011/0264528 A1 | 10/2011 | Whale |
| 2011/0270685 A1 | 11/2011 | Marks et al. |
| 2011/0307481 A1 | 12/2011 | Leite et al. |
| 2011/0321083 A1 | 12/2011 | Rouse et al. |
| 2012/0011550 A1 | 1/2012 | Holland et al. |
| 2012/0022947 A1 | 1/2012 | Esprey |
| 2012/0047219 A1* | 2/2012 | Feng ................... G06F 16/2465 |
| | | 709/207 |
| 2012/0054791 A1 | 3/2012 | Millar et al. |
| 2012/0150631 A1 | 6/2012 | Root et al. |
| 2012/0158476 A1 | 6/2012 | Neystadt et al. |
| 2012/0216226 A1 | 8/2012 | Humphrey et al. |
| 2012/0232956 A1 | 9/2012 | Dilip et al. |
| 2012/0266197 A1 | 10/2012 | Andrews, II et al. |
| 2012/0297417 A1 | 11/2012 | Philpott et al. |
| 2012/0311649 A1 | 12/2012 | Patten et al. |
| 2013/0019261 A1 | 1/2013 | Huber et al. |
| 2013/0297623 A1 | 11/2013 | Niyogi et al. |
| 2014/0013350 A1 | 1/2014 | Pan et al. |
| 2015/0206348 A1 | 7/2015 | Koreeda |
| 2016/0301986 A1 | 10/2016 | Bonvolanta |
| 2017/0272823 A1 | 9/2017 | White |
| 2017/0364950 A1 | 12/2017 | Elvekrog et al. |
| 2019/0026774 A1 | 1/2019 | Morris et al. |

OTHER PUBLICATIONS

"ebay", www.ebay.com; Jun. 28, 2011.
"Facebook", www.facebook.com; Jun. 28, 2011.
"Google AdSense", www.google.com/adsense; Jun. 28, 2011.
"Myspace", www.myspace.com; Jun. 28, 2011.
"Priceline.com", www.priceline.com; Jun. 28, 2011.
Spring, Martin et al., "Service, services and products: rethinking operations strategy", Lancaster University Management School, Lancaster, UK, International Journal of Operations and Production Management, vol. 29, No. 5,, 2009, pp. 444-467.
Brassil, "Large-Scale Personalized Video Streaming with Program Insertion Proxies", IEEE Communications Magazine, IEEE Service Center, vol. 42(8), (Aug. 2004), 104-110.

* cited by examiner

METHOD AND APPARATUS FOR MARKETABILITY ASSESSMENT

CROSS REFERENCE TO RELATED APPLICATIONS

This application is a continuation of U.S. application Ser. No. 13/173,839, filed Jun. 30, 2011, which is incorporated herein by reference in its entirety.

The present application is related to co-pending U.S. application Ser. No. 13/167,998 (now U.S. Pat. No. 10,108, 980), filed Jun. 24, 2011, by Morris, et al., entitled "Method and Apparatus for Targeted Advertising." All sections of the aforementioned application are incorporated herein by reference.

FIELD OF THE DISCLOSURE

The present disclosure relates generally to marketing and more specifically to assessment of marketability.

BACKGROUND

Consumer products and services are generally promoted by way of advertising. Marketers, for example, purchase advertising positions on broadcast and print media. Celebrities are sometimes employed to take advantage of their personas for promoting products and services. Search engines and social networks can also be used by marketers to promote products or services.

DETAILED DESCRIPTION

Figure 1:
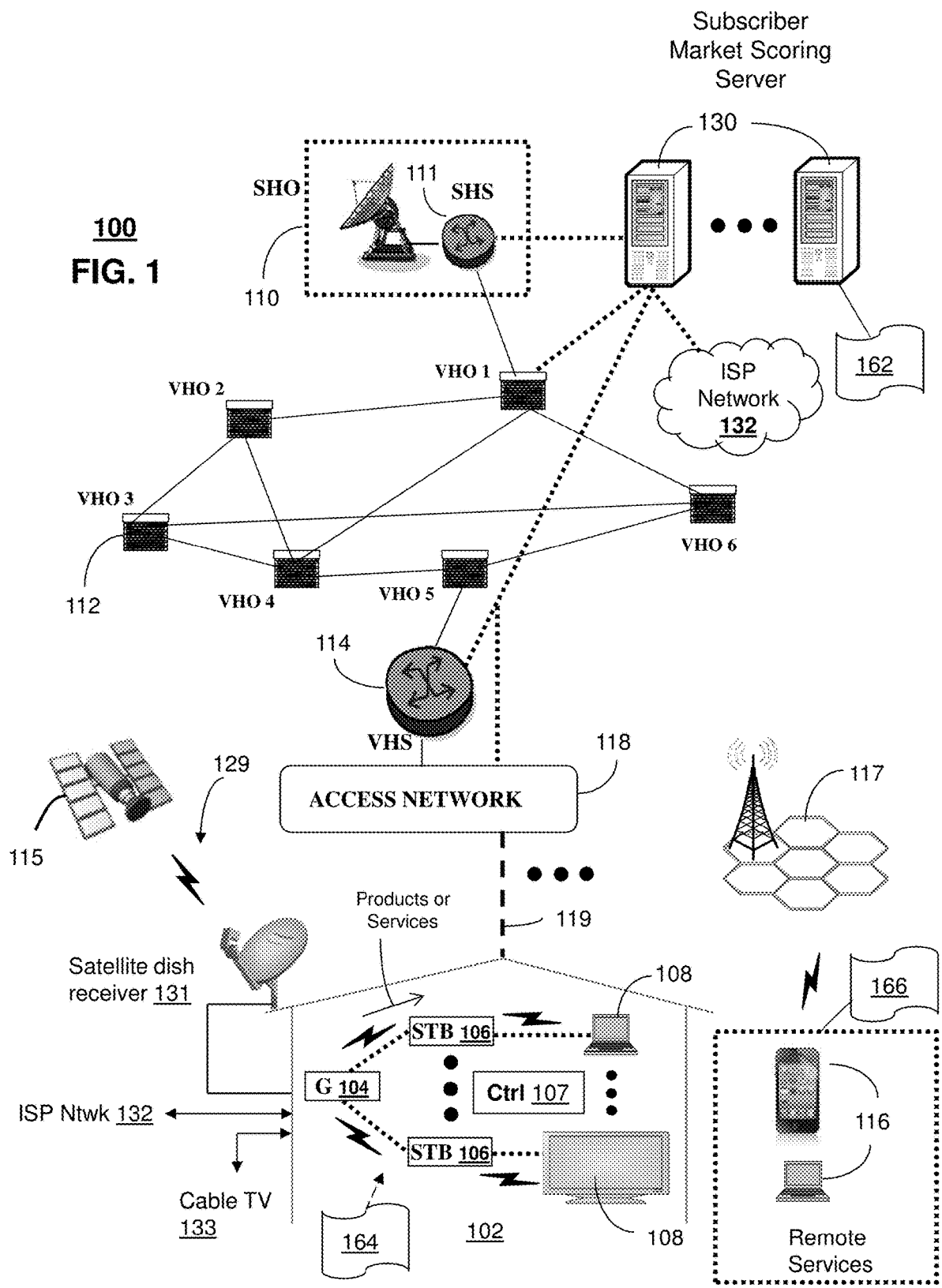
FIGS. 1-2 depict illustrative embodiments of communication systems that provide media services.

The present disclosure describes, among other things, illustrative embodiments for targeted advertising by identifying subscribers (followers) who directly or indirectly are influenced by other subscribers (leaders). In one embodiment a commercial value can be assigned to a subscriber leader for the subscriber leader's draw of subscriber followers. One or more of the exemplary embodiments can also provide identification of subscriber leaders and followers. A correlation can be determined between the consumption of products and services of a subscriber leader and subscriber followers. A value can be assessed for subscriber follower consumption according to the correlation. A marketable value can also be determined for the subscriber leader and/or for access to subscriber followers.

One embodiment of the present disclosure includes a method where a subscriber leader is identified. In turn, subscriber followers that follow the subscriber leader are identified. First products or services are consumed by the subscriber leader. The first products or services are identified as distributed by a media service provider over a communication system. The first products or services are consumed by the subscriber leader by way of a first media processor. Second products or services are identified as distributed by the media service provider over the communication system. The second products or services are consumed by the subscriber followers by way of second media processors. The first and second products and services are compared to determine if a correlation exists between the first products or services consumed by the subscriber leader and the second products or services consumed by the subscriber followers. A value of consumption for the second products and services is assessed based on the determined correlation. In turn, the value of consumption is used to determine a marketable value for the subscriber leader.

One embodiment of the present disclosure includes a computer-readable storage medium including computer instructions. The computer instructions can identify a subscriber leader and subscriber followers that follow the subscriber leader. The computer instructions can determine whether a correlation exists between first products or services consumed by the subscriber leader and second products or services consumed by the subscriber followers. The consumed first and second products or services can be distributed by a media service provider over a communication system, where the first and second products or services are consumed by way of one or more media processors. The computer instructions can assess a value of consumption for the second products or services responsive to the correlation that has been determined. The computer instructions can also be for determining a marketable value for the subscriber leader according to the assessed value of consumption.

One embodiment of the present disclosure includes a device having a memory and a processor. The processor can be operable to determine whether a correlation exists between first products or services consumed by a subscriber leader and second products or services consumed by subscriber followers of the subscriber leader. The consumed first and second products or services can be distributed by a media service provider over a communication system. The first and second products or services can be consumed by way of one or more media processors. The processor can also be operable to identify market sector classifications for each of the second products or services consumed. The processor can further be operable to assess values of consumption for the market sector classifications of the second products or services responsive to the correlation determination. The processor can also be operable to determine marketable values for the subscriber leader according to the market sector classifications and the assessed values of consumption.

FIG. 1 depicts an illustrative embodiment of a first communication system 100 for delivering media content. The communication system 100 can perform a method of subscriber market scoring. The communication system can identifying certain subscribers to services of the communication system 100 as subscriber leaders based on popularity data associated with these subscribers. Certain other subscribers can be identified as subscriber followers who, for example, access subscriber-generated content over the communication system 100. The communication system 100 can acquire permission from subscriber leaders and subscriber followers to allow the system to monitor, collect, analyze, use, and share data associated with monitored characteristics and interrelationships between subscriber leaders and subscriber followers. This data can be useful for marketing of products and/or services.

The communication system 100 can collect and analyze data corresponding to measured characteristics of the subscriber leaders and the subscriber followers. The communications system 100 can also identify products and/or services consumed by both subscriber leaders and subscriber followers as these products and/or services are distributed by or require interaction with any part of the communication system 100. A value of consumption for the products and/or services consumed by subscriber leaders and subscriber followers and can be further used to determine a marketable value for subscriber leaders. Marketing information and/or access to marketing and advertising entities regarding subscriber leaders and/or the subscriber followers can be provided to third parties based upon the marketable value of the subscriber leaders.

The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to otherpresent or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

Communication system 100 can also provide for all or a portion of the computing devices 130 to function as a subscriber market scoring server (herein referred to as server 130). The server 130 can use common computing and communication technology to perform function 162, which includes among things, identifying certain subscribers to services of the communication system 100 as subscriber leaders based on popularity data associated with these subscribers. The server 130 can also be used to identify certain subscribers as subscriber followers. Subscribers can be detected as following the subscriber leaders by, for example, accessing subscriber-generated content over the communication system 100. The server 130 can also be used to acquire permission from subscriber leaders and subscriber followers to allow the server 130 to monitor, collect, analyze, use, and share data associated with monitored characteristic and interrelationships between subscriber leaders and subscriber followers that can useful for marketing of products and/or services.

The server 130 can further be used to collect and analyze data corresponding to interactions between subscriber leaders and subscriber followers over the communication system 100, including the media processors 106. Subscriber follower access to content generated and/or associated with subscriber leaders can be tracked by the server 130. The server 130 can also be used to collect and analyze data corresponding to measured characteristics of the subscriber leaders and the subscriber followers. These measured characteristics can include, among other data, ratings of subscriber leaders and of the content of subscriber leaders, demographic characteristics of subscriber leaders and of subscriber followers, market sector characteristics of products and/or services consumed, and reputational data for the subscriber leaders and subscriber followers.

Server 130 can also be used to identify products and/or services consumed by both subscriber leaders and subscriber followers as these products and/or services are distributed by or require interaction with the server 130, the media processors 106, or any part of the communication system 100. Server 130 can be used to assess a value of consumption for the products and/or services consumed by subscriber leaders and subscriber followers. Server 130 can further be used to determine a marketable value for subscriber leaders, based at least in part on the value of consumption. The server 130 can also be used to provide marketing information and/or access to marketing and advertising entities regarding subscriber leaders and/or the subscriber followers based upon the marketable value of the subscriber leaders. The media processors 106 and wireless communication devices 116 can be adapted with software functions 164 and 166, respectively, to further utilize the services of the server 130. For example, the media processors 106 and wireless communication devices 116 can be adapted to execute software functions 164 and 166, respectively, to collect and report subscriber follower accesses to media content generated by or associated with subscriber leaders.

Figure 2:
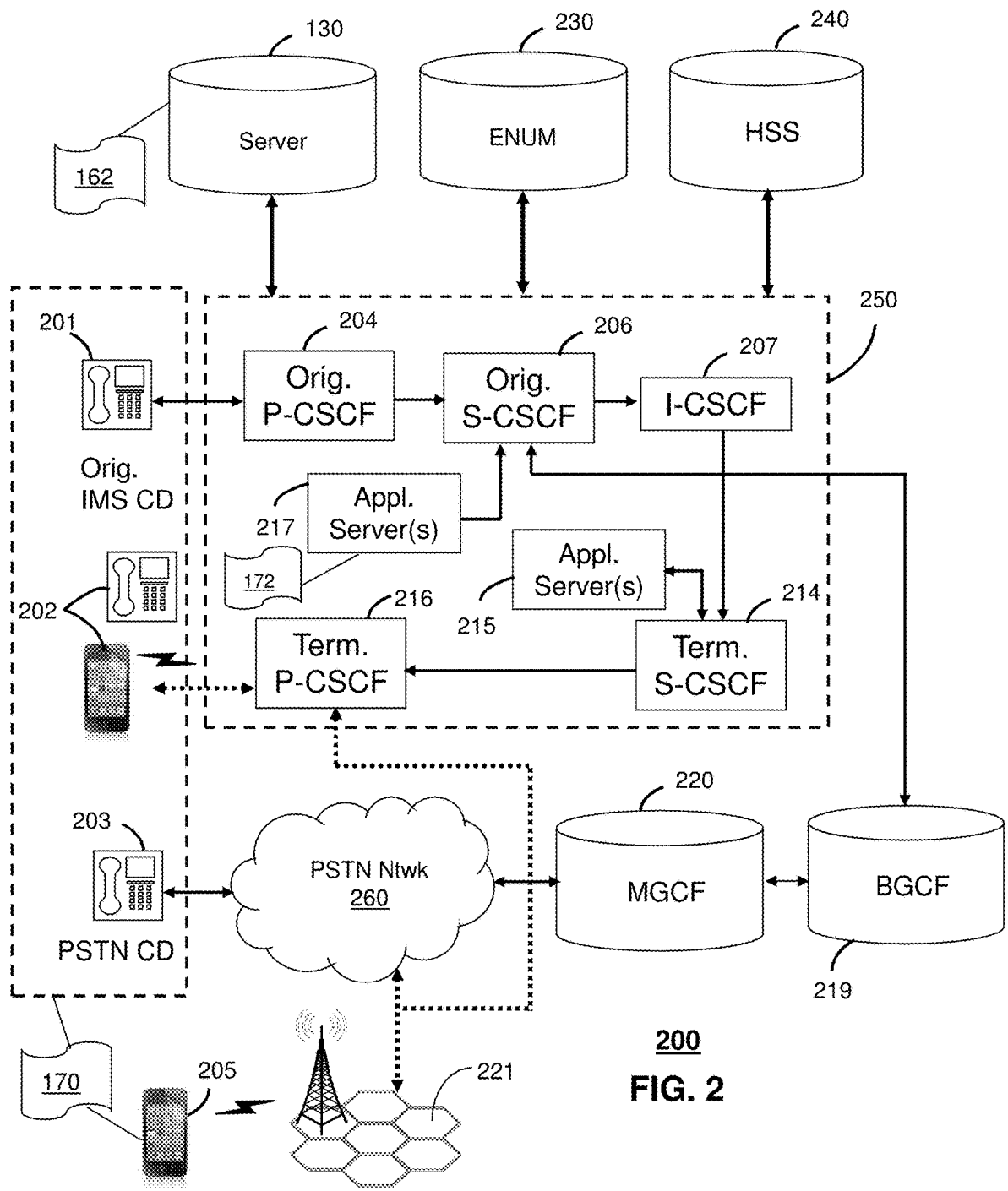

FIG. 2 depicts an illustrative embodiment of a communication system 200 employing Internet Protocol Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (aSs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1. It is further contemplated that the CDs of FIG. 2 can operate as wireline or wireless devices. For example, the CDs of FIG. 2 can be communicatively coupled to a cellular base station 117 such as shown in FIG. 1, a femtocell (not shown), a WiFi router, a DECT base unit, or another suitable wireless access unit to establish communications with the IMS network 250 of FIG. 2.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. Although not shown, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250.

Communication system 200 can include or otherwise be coupled with server 130 of FIG. 1 for purposes similar to those described above. It is further contemplated by the present disclosure that the server 130 can perform the function 162 and thereby provide a subscriber scoring application for subscribers associated with CDs 201, 202, 203, and 205. CDs 201, 202, 203, and 205 can be adapted with software to perform function 170 to utilize and integrate with the subscriber scoring application performed by the server 130. It is further contemplated that the server 130 can be an integral part of the application server(s) 217, where the application server(s) 217 performs function 172, which can be substantially similar to function 162 and adapted to the operation of the IMS network 250.

Figure 3:
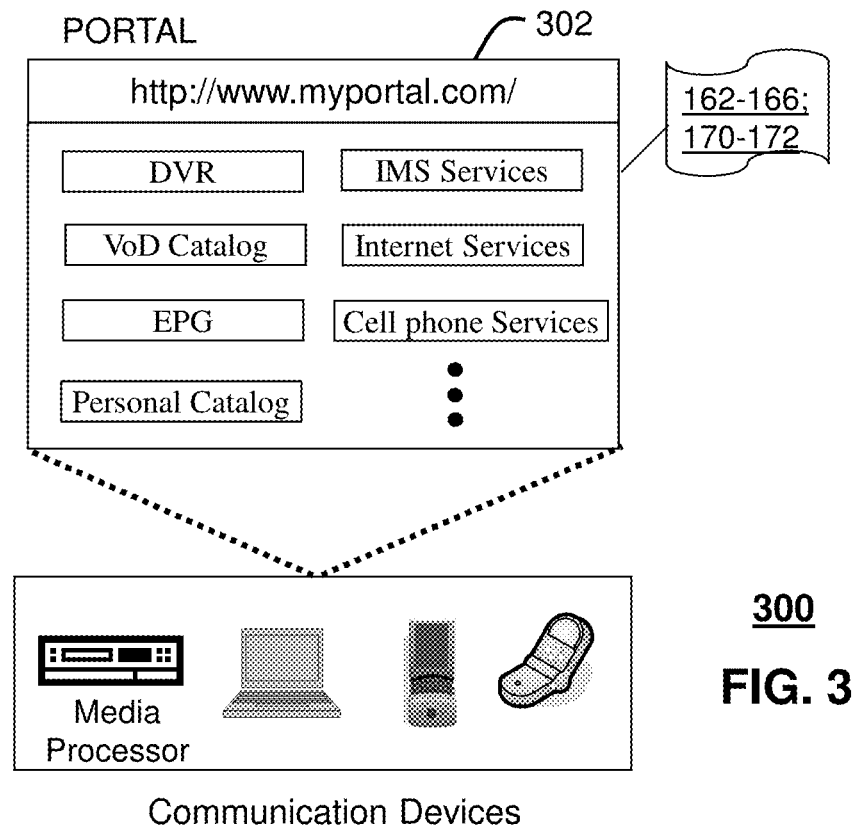
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162-172 of the devices of FIGS. 1-2, respectively, as described earlier.

Figure 4:
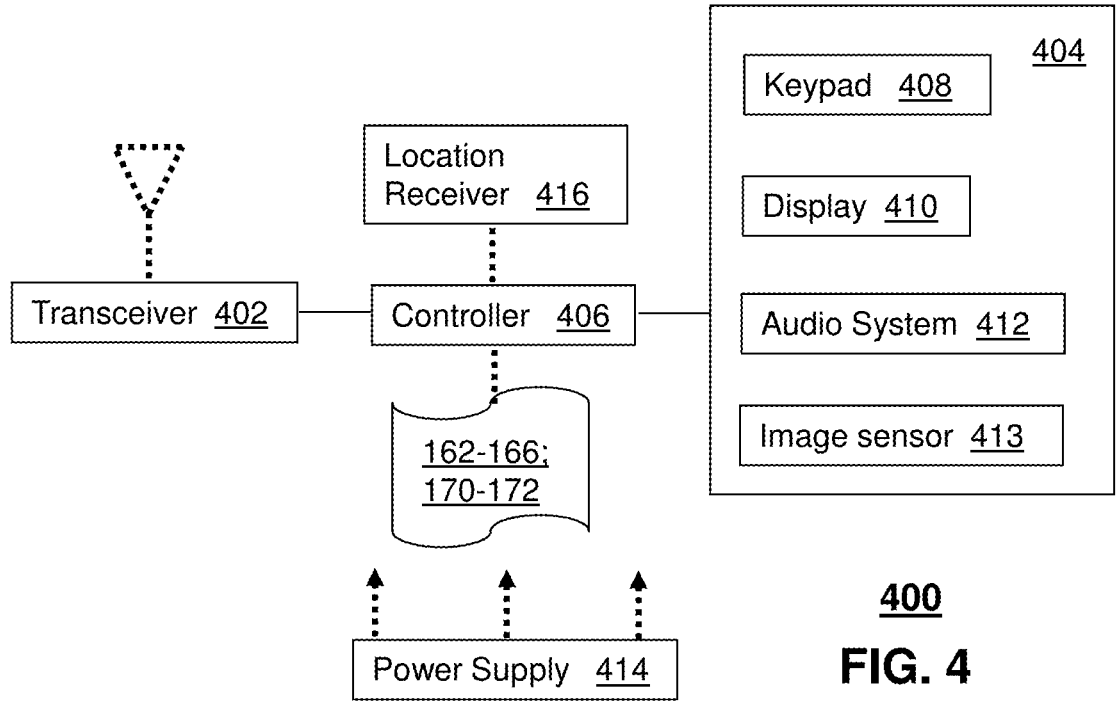
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is further contemplated by the present disclosure that the communication device 400 can operate as a server from which a subscriber scoring application operates as described below. It follows from these illustrations that the controller 406 can be adapted in various embodiments to perform the functions 162, 164, 166 of the server, a media processor, and a wireless communication device, respectively.

Illustrative embodiments of methods that can operate in portions of the communication device of FIG. 4 are described below.

Figure 5:
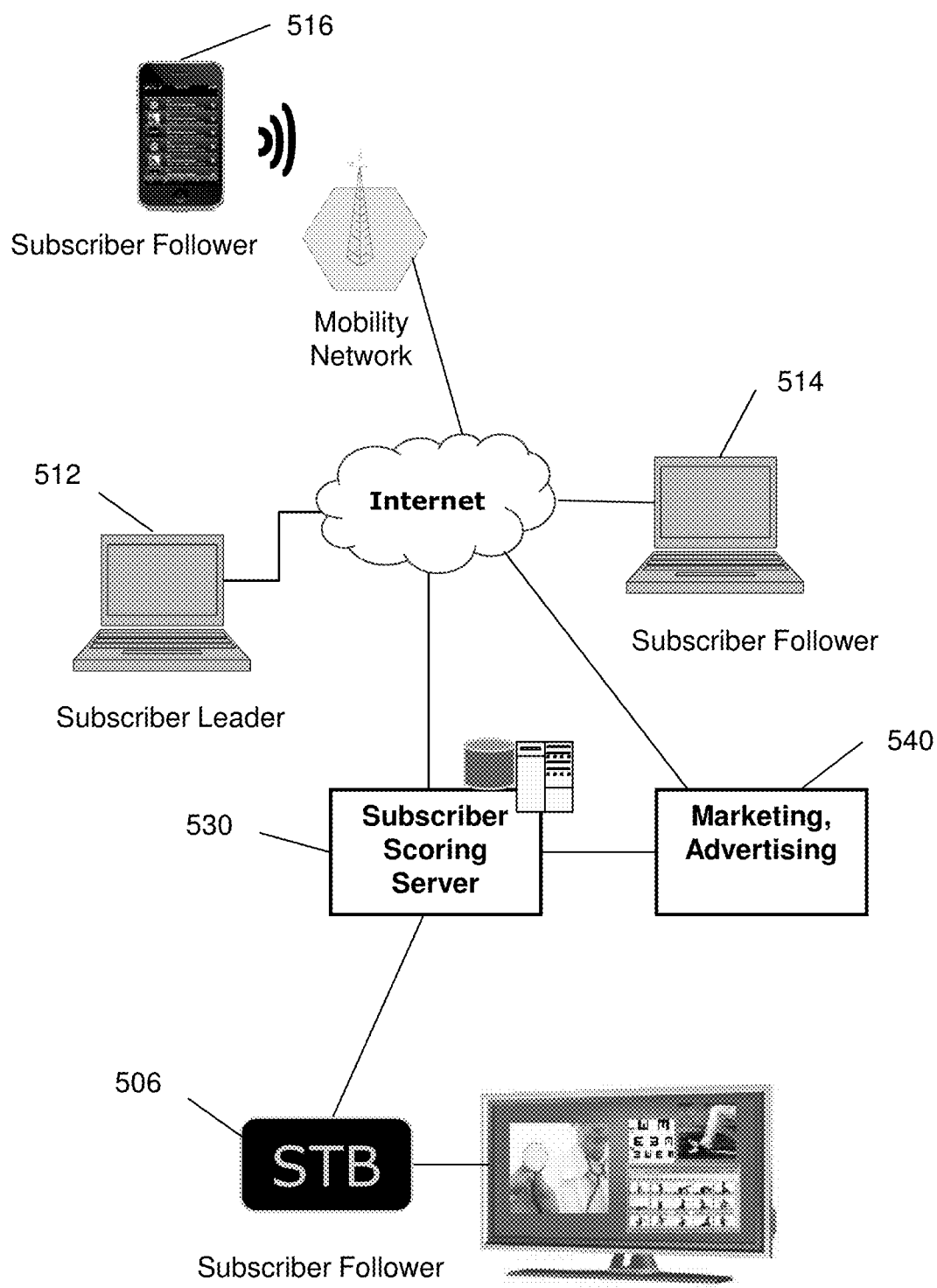
FIG. 5 depicts an illustrative embodiment of a system.

FIG. 5 depicts an illustrative embodiment of a system 500 for scoring subscriber marketability. System 500 can be overlaid or operably coupled to communication systems 100-200 as another representative embodiment of communication systems 100-200. System 500 can include a server 530 in communication with media processors 506 (such as set-top boxes), computing devices 512 and 514 (such as a laptop computer, tablet, etc.), and wireless communication devices 516 (such as mobile phones, smart phones, etc.). The mobile devices 516 can be communicatively coupled to the server 530 by way of a mobility network coupled to the Internet or other communication means. The computing devices 512 can also be communicatively coupled to the server 530 by way of the Internet or other communication means.

The present disclosure contemplates a server 530 that among other things is capable of identifying certain subscribers to services of a communication system as subscriber leaders 512 based on popularity data associated with these subscribers. The remote server 530 can also be used to identify certain subscribers to services of the communication system as subscriber followers 506, 514, and 516, where it can be demonstrated that these subscribers are following the subscriber leaders 512 by, for example, content generated by the subscriber leaders 512. The remote server 530 can be used to acquire permission from subscriber leaders 512 and subscriber followers 506, 514, and 516 to allow the server 530 to further monitor, collect, analyze, use, and share data associated with monitored characteristic and interrelationships between subscriber leaders and subscriber followers that can useful for marketing of products and/or services.

Server 530 can be used to collect and analyze data corresponding to interactions between subscriber leaders 512 and subscriber followers 506, 514, and 516. Subscribe follower access to content generated and/or associated with subscriber leaders can be tracked by the server 530. The server 530 can also be used to collect and analyze data corresponding to measured characteristics of the subscriber leaders 512 and the subscriber followers 506, 514, and 516. These measured characteristics can include, among other data, ratings of subscriber leaders 512 and of the content of subscriber leaders 512, demographic characteristics of subscriber leaders and of subscriber followers 506, 514, and 516, market sector characteristics of products and/or services consumed, and reputational data for the subscriber leaders 512 and subscriber followers 506, 514, and 516.

Server 530 can be used to identify products and/or services consumed by both subscriber leaders 512 and subscriber followers 506, 514, and 516 as these products and/or services are distributed by or require interaction with the server 530, media processors 506, or any part of the communication system. Server 530 can be used to assess a value of consumption for the products and/or services consumed by subscriber leaders 512 and subscriber followers 506, 514, and 516. The server 530 can further be used to determine a marketable value for subscriber leaders 512, based at least in part on the value of consumption. The server 530 can also be used to provide marketing information and/or marketing access to marketing and advertising entities regarding the subscriber leaders 512 and/or the subscriber followers 506, 514, and 516, based upon the marketable value of the subscriber leaders 512.

Figure 6:
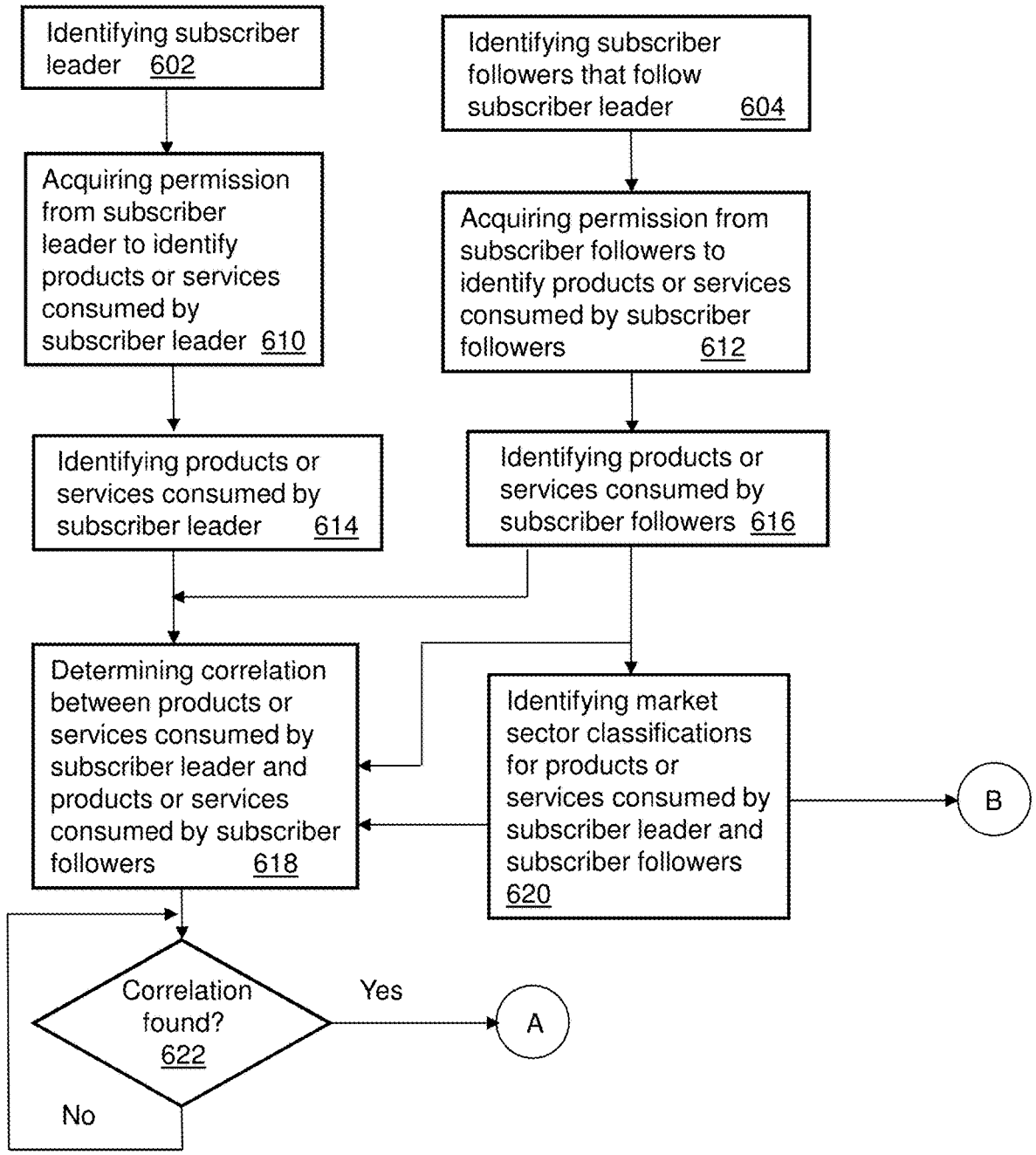
FIGS. 6-7 depict an illustrative embodiment of a method operating in portions of the systems described in FIGS. 1-5.

FIG. 6 depicts an illustrative method 600 that operates in portions of the devices of FIGS. 1-5. Method 600 can begin with step 602 in which a server 130 identifies a subscriber of the media service provider as a subscriber leader. In step 604, the server 130 identifies other subscribers as subscriber followers who follow the activities of the subscriber leader. The subscriber leader and subscriber followers can be subscribers to a common media service providers operating in the form of communications system of FIGS. 1-3, including server 130. The subscriber leader and subscriber followers can also be subscribers to different media service providers, in which server 130 obtains data corresponding to non-subscribers of communications system 100 through a data sharing arrangement established with other media service providers. The subscriber leader is a subscriber who attracts interest from other subscribers. Subscriber followers can express interest in the subscriber leader by direct or indirect means. A subscriber follower can directly express interest in following the activities of a subscriber leader by, for example, becoming a member of a social media page (e.g., becoming a FaceBook™ friend or Twitter™ follower) or by establishing a user account on a webpage associated with the subscriber leader.

A subscriber follower can indirectly express interest in following the activities of a subscriber leader by simply tracking the subscriber leader's activities through webpages, blogs, social networking and posted media content. The subscriber follower can also make or receive telephone or cellular calls to the subscriber leader without expressly identifying him/herself as a follower. Subscriber followers can also track the subscriber leader by accessing subscriber leader-oriented content information through the communication system 100 using a public and/or private network, browsing the Internet, interactive telephone and cellular communication, instant messaging, an and/or email. Subscriber leader-oriented information can be content generated by or for the subscriber leader by third parties, including other subscriber leaders or followers. The server 130 can identify a subscriber as a subscriber leader by monitoring, collecting, storing, and analyzing data from the communications system 100. The server 130 can, for example, monitor interactions over the communication system 100 such as website traffic, social media traffic, membership, and activities, instant messaging traffic, and telephone and cellular communications. Other techniques for detecting subscriber followers that exhibit interest in subscriber followers and for a server to monitor and identify this interest are contemplated by the present disclosure.

In step 610, the server 130 can acquire permission from the subscriber leader to allow the server 130 to monitor and identify products or services consumed by the subscriber leader over the communication system 100. In step 612, the server 130 can also acquire permission from the subscriber followers to allow the server 130 to monitor and identify products or services consumed by the subscriber followers over the communication system. The server 130 can offer the subscribe leader and subscriber followers an opportunity to opt-in to a program offering discounted or free products and services, or other incentives, in exchange for permitting the server 130 to monitor products and/or services consumed over the communication system 130. For example, the server 130 can offer a previously-identified subscriber leader free video-on-demand (VOD) services in exchange for monitoring all on-line purchases made by or delivered to the subscriber leader over the communications system 100.

In steps 614 and 616, the server 130 can identify products or services consumed by the subscriber leader and the subscriber followers. The server 130 can monitor consumption of products and/or services ordered, distributed, or traversing the communication system 100. The server 130 can further monitor consumption over other communication systems, if needed, by way of information sharing agreements between the service provider of the communication system 100 and service providers of other communication systems. The server 130 can monitor products and/or services distributed by the communication system 100. The server 130 can also monitor products and/or services delivered to and consumed by the subscriber leader and the subscriber followers by means of monitoring consumption at the media processors 106. Other techniques for monitoring consumption of products and/or services by the subscriber leader and subscriber followers are contemplated by the present disclosure.

In step 618, the remote server 130 can determine whether a correlation exists between the products or services consumed by the subscriber leader and the products or services consumed by subscriber followers of the subscriber leader. Where a subscriber leader has been identified to draw interest from a group of subscribe followers, then such a subscriber leader can, directly or indirectly, influence consumption choices of the subscribe followers. That is, the subscriber followers may be found to exhibit consumption choices that mimic those choices made by the subscriber leader. The subscriber leader can act as a direct advocate or evangelist for particular products or services by communicating praiseworthy information about the product or service to subscribe followers through website, blog, or social media messages. The subscriber leader can act as a draw for subscriber followers, much as media content on a broadcast station, to attract an audience for the presentation of advertising content. Subscriber followers can be led, by targeted advertising, to consume the same products and services consumed by the subscriber leader, whether or not the subscriber leader's consumption is coordinated with a third-party seller. The server 130 can analyze the collected information on product and/or service consumption by the subscriber leader and the subscriber followers to look for a factor or degree of correlation using, for example, statistical analysis such as a regression model. The server 130 can generate a correlation factor for the subscriber leader and subscriber followers with a high or low value depending on how closely the consumption patterns track. The correlation factor can be considered an estimate of an influence of the subscriber leader over consumption patterns of the subscriber followers.

In step 620, the server 130 can identify market sector classifications for the products or services consumed by the subscriber leader and the subscriber followers. Market sector classifications allow the overall market of all products and services to be divided into segments according to common characteristics of products and/or services consumed. The server 130 can divide the set of products and services identified as consumed by subscriber leaders and followers into several market segments based on classification of the product or service. For example, the consumed products and services can be divided among the classifications of health care, clothing, jewelry, and automotive. Further segmentation can be used to separate products and services as, for example, health care products and health care services. Further sub-classification can also be used to separate market sub-segments as, for example, adult clothing, teen clothing, and infant clothing. The server 130 can perform market segment classification on the identified products and/or services consumed by the subscriber leader and/or the subscriber followers. The server 130 can also perform market segment classification before the correlation factor is determined.

Figure 7:
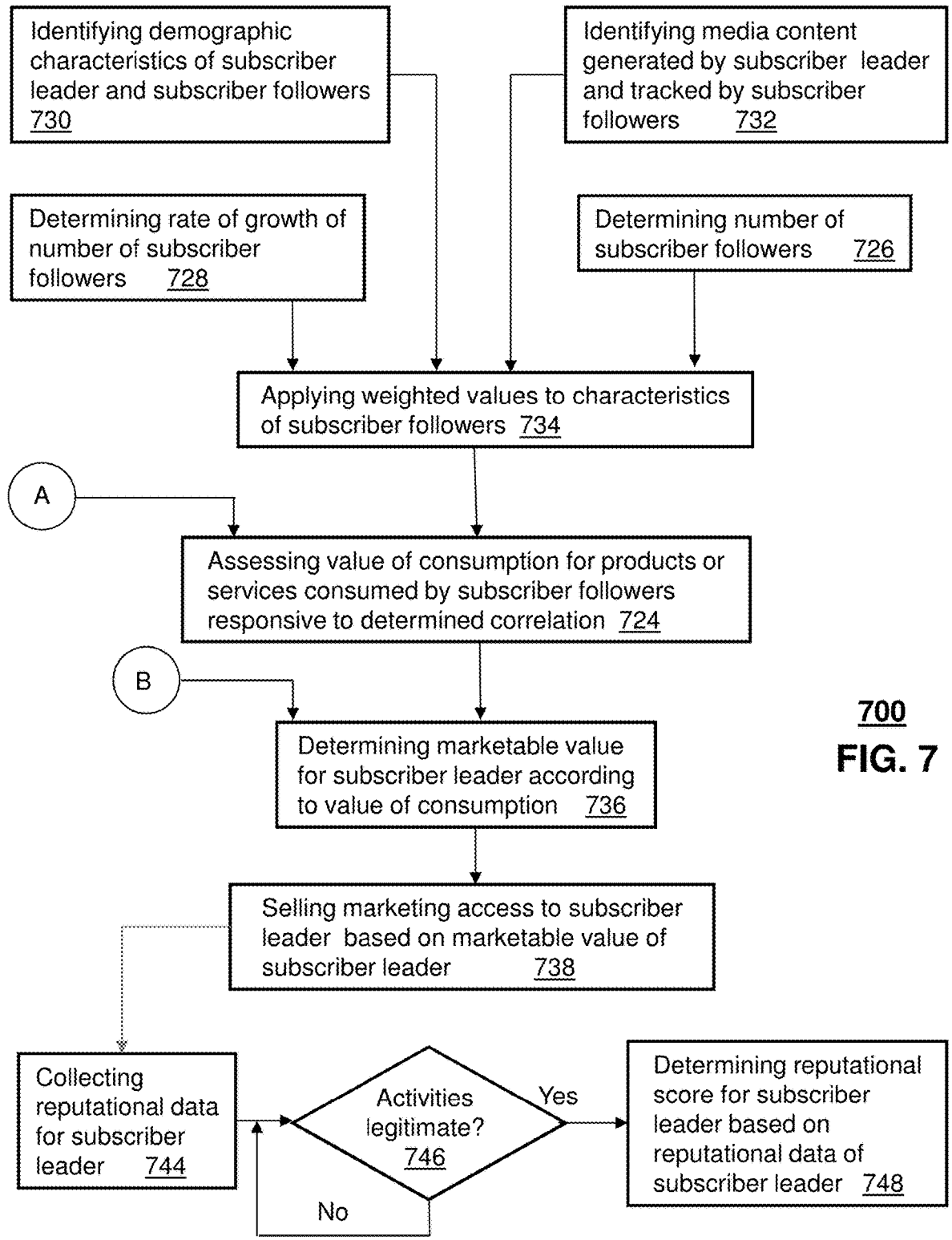

FIG. 7 depicts an illustrative method 700 that operates in portions of the devices of FIGS. 1-5. Method 700 can begin with step 724, which continues from step 622 of FIG. 6. If a correlation is found between consumption of identified products or services for the subscriber leader and the subscriber followers, in step 622, then the server 130 can assess the value of consumption for the products or services consumed by the subscriber followers in step 724. The value of consumption can be an estimate of the total economic value of the products and/or services consumed by the subscriber followers as influenced by the subscriber leader. The server 130 can use the consumption data collected from subscriber followers who have opted-in to estimate consumption data for those who have not opted-in on an assumption that the subscriber followers who have not opted into the program have similar consumption characteristics to those that have opted in. The server 130 can consider actual or estimated purchase price information as well as retail, wholesale, and discount pricing in calculating the value of consumption. The value of consumption may be calculated and reported for any period of time, including daily, weekly, monthly, yearly, and can be calculated for significant selling periods, including holiday selling seasons. The server 130 can also determine the value of consumption for the subscriber leader, which may be important where the opt-in arrangement for the subscriber leader includes incentives based on products and services consumed by the subscriber leader. Incentives can also be based on consumption from subscriber followers. The server 130 can include other characteristics of the subscriber leader and subscriber followers in the determination of the value of consumption as will be described below.

In step 726, the server 130 can determine a number of subscriber followers that track a subscriber leader. The server 130 can identify each subscriber follower by detecting direct or indirect expressions of interest in the subscriber leader. A measure of the number of the subscriber followers can provide information on the size of the subscriber leader's influence. In step 728, the server 130 can further determine a rate of growth for the number of subscriber followers 728. The rate of growth of subscriber followers can indicate a growing or receding popularity of a subscriber leader. In step 730, the server 130 can identify demographic characteristics of the subscriber leader and the subscriber followers. The server 130 can access information from subscriber accounts, including, for example, demographic information regarding subscriber age, income range, educational level, marital status, residential location, and parental status. The demographic information of the subscriber leader and the subscriber followers can be accessed as part of the opt-in process. Demographic information for the subscriber leader and subscriber followers can provide context for the types of individuals influenced by the subscriber leader. In step 732, the server 130 can identify media content generated by the subscriber leader and tracked by the subscriber followers. The server 130 can monitor subscriber-generated content accessible to subscriber followers and to the server 130 via the communication system 100 as presented, for example, on websites, blogs, or social networks. Media content from the subscriber leader can provide information useful for understanding the subscriber's approach in communicating with subscriber followers. Media content type, quality, volume, and frequency of distribution, can be an important factor in the subscriber leaders efficacy for influencing subscriber followers. Other techniques for monitoring characteristics of the subscriber leader and subscriber followers are contemplated by this disclosure.

In step 734, the server 130 can apply weighted values to characteristics of subscriber followers. Value weighting can be applied to characteristics collected by the server 130, including value weighting the number of subscriber followers, the rate of growth of the subscriber followers, the demographic characteristics of the subscriber leader and subscriber followers, and the identified media content generated by the subscriber leader. The server 130 can apply relative weightings to the various subscriber characteristics as needed to emphasize characteristics important for marketing. For instance, subscriber followers of a particular age bracket (e.g., mid 50's) can weighted higher than other age brackets (e.g., teens) because they have a higher level of disposable income. Alternatively, younger subscriber followers can be weighted higher for certain marketing segments where young purchasers dominate. Subscriber followers can be weighted based on income range which can correspond to capabilities to purchase certain higher cost items. Educational level, marital status, and parental status can be used for weighting the subscriber followers, especially where these factors are found to predict interest in purchasing certain goods and services. Residential location can be used for weighting subscriber followers as this can be very important where advertising is for a local or regional product or service. The server 130 can apply weighting to any, all, or none of the characteristics. The server 130 can include the weighted characteristics as part of the determination of the value of consumption assessed in step 724.

In step 736, the server 130 can determine a marketable value for the subscriber leader according to the assessed value of consumption. The marketable value represents a conversion of the value of consumption for the products and services consumed by the subscriber followers, as influenced by the subscriber leader, into a value, or score, representing the monetary worth of the subscriber leader as a driver for marketing and advertising products or services. In one embodiment, the server 130 can determine a single marketable value for marketing of any product or service. In another embodiment, the server 130 can determine several different marketable values based, for example, on various market sector classifications as identified in step 620. The marketable value can also be assessed in part according to a schedule of rates depending on market size. In one embodiment, the marketable rate for the subscriber can be based on access to the subscriber leader for placement of marketing material in the media content generated by the subscriber leader for marketing, and/or access to placement of marketing material in content consumed by the subscriber followers.

In step 738, the server 130 can be used to provide third party marketing access to the subscriber leader based on the marketable value of the subscriber leader in exchange for consideration. The server 130 can be adapted to provide access to the subscriber leader for placement of marketing material in media content generated by the subscriber leader for marketing, and/or access to placement of marketable content in content consumed by subscriber followers. The server 130 can adapted to market to third parties the marketable value of the subscriber leader and/or subscriber followers. Other techniques providing third party access to the marketable value information are contemplated by this disclosure.

In step 744, the server 130 can also collect reputational data for the subscriber leader. Various reputational data can be collected by the server 130 and used to characterize qualities of the subscriber leader, the subscriber followers, and/or the content associated with the subscriber leader. The server 130 can collect and track reputational data from any source accessible from the communication system 100. The server 130 can collect ratings of the subscriber leader and/or of content associated with the subscriber leader by the subscriber followers. The server 130 can monitor activities of the subscriber leader that are followed by subscriber followers.

The server 130 can collect ratings of the subscriber leader. Ratings can be submitted to the subscriber leader's website, blog, or social network site by subscriber followers or other third parties. The ratings can be determined from comments generated by subscriber followers about the subscriber leader, media content generated by or associated with the subscriber leader, and characteristics of the subscriber leader oriented website, blog, or social media site. Ratings can be in the form of textual comments, numerical scores, emoticons, and bimodal phrases ("like or dislike").

The server 130 can measure frequency of subscriber leader activity with followers. The server 130 can measure the frequency of new postings of content by the subscriber leader on a website, blog, or social media site. The server 130 can detect a frequency of blog updates by the subscriber leader. The server 130 can detect if the number of daily followers is heavy or light.

The server 130 can collect a credit rating for the subscriber leader and/or the subscriber followers from credit bureaus. Permission to request a credit rating can be obtained as part of the opt-in process. Credit ratings can provide an indirect measure of reputation that can be used to determine the credit worthiness of the subscriber leader and/or the subscriber followers to pay for products or services marketed to them by promoters.

The server 130 can also collect and analyze the service provider subscription account histories of the subscriber leader and subscriber followers. The server 130 can determine payment patterns from account histories, such as early or late payment of bills or payment by check, automatic withdraw, or credit card. The server 130 can determine heavy or light users of services, tendencies to purchase extra services, or to respond to special offers or incentives. The server 130 can detect subscribers who frequently require customer service, who register complaints about products or services, or who frequently change service providers. Account histories can also provide reputational data that can be used by the server 130 to characterize how subscriber followers might be expected to interact with future sellers of products and services.

In step 746, the server 130 can verify if the activities of the subscriber leader are legitimate. For example, the server 130 can scan content of a subscriber leader's website, blog, or social media site to detect computer malware including viruses, worms, Trojan horses, and spyware. The server 130 can evaluate the email patterns of the subscriber leader to determine if the subscriber leader engages in improper emailing activities, including "spamming" and "phishing" activities. The server 130 can monitor network activities emanating from computers used by or associated with the subscriber leader or the website, blog, or social media site of the subscriber leader to detect activities associated with unauthorized accesses to the computer resources of other parties, including "hacking" activities. The server 130 can detect subscriber leaders who illegally use the communication system 100 and prohibit these subscribes from participating in third-party marketing activities.

In step 748, the server 130 can determine a reputational score for the subscriber leader based on the collected and analyzed reputational data. For example, the reputational score can be determined from any combination of ratings of the subscriber leader, frequency of subscriber leader activity with subscriber followers, legitimacy of activities of the subscriber leader, credit ratings, and account histories. The collected reputational data can be weighted to accentuate specific aspects important to marketing clients. A single reputational score can be determined for the combination of the subscriber leader and subscriber followers. Individual reputational scores can be determined for the subscriber leader and the subscriber followers. The reputational score can be provided to third parties as an enhancement to the marketable value information of the subscriber leader. The reputational score can be used by third parties as a stand-alone metric for accessing a marketable worthiness of the subscriber leader and/or subscriber followers. Other techniques providing third party access to the reputational score information are contemplated by this disclosure.

Upon reviewing the aforementioned embodiments, it would be evident to an artisan with ordinary skill in the art that said embodiments can be modified, reduced, or enhanced without departing from the scope and spirit of the claims described below. In one embodiment, the server 130 can be adapted to acquire permission from the subscribe leader and the subscriber followers independently so that differing incentives can be offered for leaders and followers. In one embodiment, the server 130 can be adapted to identify products or services consumed by the subscriber leader and subscriber followers by tracking media content delivered to a subscriber leader or follower over a media processor 106 for consumption (viewing) on the subscriber's television. In one embodiment, a series of reputational scores are determined for the subscriber leader and subscriber followers based on the identified market sector classifications for products and services. In one embodiment, the server 130 can convert an assessed value of consumption into a marketable value using a comparative database of marketable values for Internet marketing. In one embodiment, the server 130 can convert an assessed value of consumption into a marketable value using a marketing value bidding processes. In one embodiment, the reputation score can be combined with the marketable value of the subscriber leader to create a combined score that further defines the marketability of the subscriber leader. In another embodiment, if state or federal laws allow a service provider to monitor its subscribers without consent, then the aforementioned opt-in programs can be avoided. Other embodiments are contemplated by the present disclosure.

Figure 8:
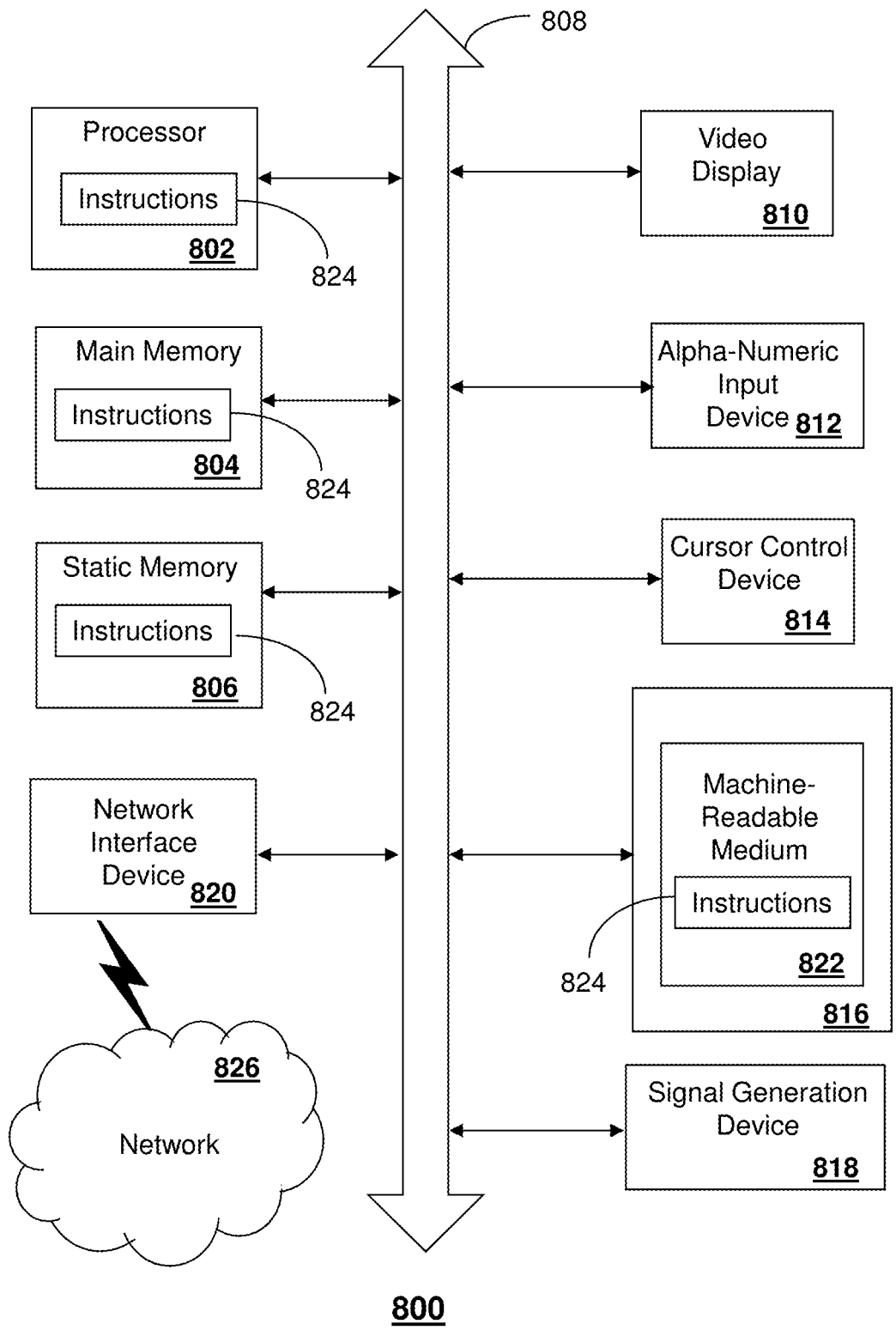
FIG. 8 is a diagrammatic representation of a machine in the form of a computer system within which a set of instructions, when executed, may cause the machine to perform any one or more of the methods discussed herein.

FIG. 8 depicts an exemplary diagrammatic representation of a machine in the form of a computer system 800 within which a set of instructions, when executed, may cause the machine to perform any one or more of the methods discussed above. One or more instances of the machine can operate, for example, as the server 130, the media processor 106, the gateway 108, the media controller 107, the communication devices 116, 201-203 and 205, or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   identifying, by a processing system including a processor, from a plurality of subscribers to services of a communication system, a subscriber leader who performs activities associated with a social media page, wherein the subscriber leader is identified in accordance with website traffic carried electronically via a network, and wherein the website traffic carried electronically via the network is identified electronically by the processing system;
   determining, by the processing system, through direct interest expressed by a subset of the plurality of subscribers by becoming members of the social media page of the subscriber leader that the subset of the plurality of subscribers is a plurality of subscriber followers of the subscriber leader, wherein the determining is further based on detection, over the network, of social media traffic corresponding to interactions associated with the subscriber leader and the subset of the plurality of subscribers;
   providing, by the processing system, a third-party system with access to the subscriber leader for placement of particular content in media content generated by the subscriber leader;
   monitoring, by the processing system, consumption of products or services by the subscriber leader and by the plurality of subscriber followers, wherein the products or services are consumed by the subscriber leader and by an opt-in subset of the plurality of subscriber followers, wherein the opt-in subset is in accordance with an opt-in procedure performed at respective communication devices of the subscriber followers in the opt-in subset to permit the monitoring, each of the communication devices including an interface for communicating with the processing system to perform the opt-in procedure;
   identifying, by the processing system, first products or services consumed by the subscriber leader;
   identifying, by the processing system, second products or services consumed by the opt-in subset of the plurality of subscriber followers;
   determining, by the processing system, a correlation between the first products or services consumed by the subscriber leader and the second products or services consumed by the opt-in subset of the plurality of subscriber followers;
   estimating, by the processing system, an influence of consumption choices of the subscriber leader over consumption patterns of the opt-in subset of the plurality of subscriber followers, in accordance with the correlation;
   assessing, by the processing system, a first value of consumption for the second products or services consumed by the opt-in subset of the plurality of subscriber followers and a second value of consumption for the second products or services associated with a non-opt-in subset of the plurality of subscriber followers, to obtain an estimate of an economic value of the second products or services consumed by the plurality of subscriber followers as influenced by the consumption choices of the subscriber leader, based on the correlation;
   obtaining, by the processing system, a marketable value of the subscriber leader in accordance with the assessing, wherein the marketable value comprises a plurality of market sector values corresponding to predefined market sector characteristics of the second products or services;
   performing, by the processing system, scanning of the social media page for malicious programs by scanning data in the social media page to detect computer malware and performing monitoring of network activities, over the network, associated with the subscriber leader for unauthorized access to computer resources by detecting for certain data indicative of computer hacking activities;

deriving, by the processing system, a reputational value for the subscriber leader based on the scanning of the social media page for malicious programs and based on the performing the monitoring of the network activities for unauthorized access to computer resources; and controlling, by the processing system, the access by the third-party system to the subscriber leader based on the reputational value, such that, if the reputational value derived based on the scanning and based on the performing the monitoring indicates that the subscriber leader is conducting illicit activities on the communication system, the access to the subscriber leader for placement of particular content in media content of the social media page generated by the subscriber leader is prohibited and the subscriber leader is prevented from engaging in particular activities associated with the third-party system, wherein prohibiting the access to the subscriber leader comprises preventing the media content of the social media page from being accessed and utilized for the placement of the particular content.

2. The method of claim 1, wherein the products or services are distributed over the communication system by a media service provider.

3. The method of claim 2, wherein the first products or services are consumed via a first media processor coupled to the communication system, and wherein the second products or services are consumed via a plurality of second media processors coupled to the communication system.

4. The method of claim 1, further comprising determining, by the processing system, from the plurality of subscriber followers a leader attribute comprising a total number of the plurality of subscriber followers or a rate of growth of the plurality of subscriber followers.

5. The method of claim 4, wherein the marketable value of the subscriber leader is determined in part according to the leader attribute.

6. The method of claim 1, wherein the plurality of subscriber followers is identified in accordance with particular website traffic over the network between the subscriber leader and the plurality of subscriber followers.

7. The method of claim 1, further comprising acquiring, by the processing system, permission from the subscriber leader for the identifying the first products or services consumed by the subscriber leader.

8. The method of claim 1, wherein the website traffic comprises content generated by the subscriber leader, content consumed by the subscriber leader, or content generated by a third party associated with the subscriber leader.

9. The method of claim 1, further comprising identifying, by the processing system, the media content generated by the subscriber leader, wherein the media content is tracked by the plurality of subscriber followers, and wherein the identifying the media content results in identified media content.

10. The method of claim 9, wherein the identified media content generated by the subscriber leader comprises text messages, audio messages, video messages, audio content, still image content, video content, or a combination thereof.

11. The method of claim 1, further comprising identifying, by the processing system, demographic characteristics of the subscriber leader or the plurality of subscriber followers.

12. A device comprising:
a processing system including a processor; and
a memory that stores executable instructions that, when executed by the processing system, facilitate performance of operations, the operations comprising:

identifying at least one of a plurality of subscribers to services of a communication system as a subscriber leader, wherein the subscriber leader is identified in accordance with website traffic carried electronically via a network, and wherein the website traffic carried electronically via the network is identified electronically by the processing system;

determining, through direct interest expressed by a subset of the plurality of subscribers by establishing a user account on a webpage associated with the subscriber leader, that the subset of the plurality of subscribers is a plurality of subscriber followers of the subscriber leader, wherein the determining is further based on detection, over the network, of instant messaging traffic corresponding to interactions associated with the subscriber leader and the subset of the plurality of subscribers;

providing a third-party system with access to the subscriber leader for placement of particular content in media content generated by the subscriber leader;

monitoring consumption of products or services by the subscriber leader and by the plurality of subscriber followers, wherein the products or services are consumed by the subscriber leader and by an opt-in subset of the plurality of subscriber followers, wherein the opt-in subset is in accordance with an opt-in procedure performed at respective communication devices of the subscriber followers in the opt-in subset to permit the monitoring, each of the communication devices including an interface for communicating with the processing system to perform the opt-in procedure;

identifying first products or services consumed by the subscriber leader;

identifying second products or services consumed by the opt-in subset of the plurality of subscriber followers;

determining a correlation between the first products or services consumed by the subscriber leader and the second products or services consumed by the opt-in subset of the plurality of subscriber followers;

estimating an influence of consumption choices of the subscriber leader over consumption patterns of the opt-in subset of the plurality of subscriber followers, in accordance with the correlation;

assessing a first value of consumption for the second products or services consumed by the opt-in subset of the plurality of subscriber followers and a second value of consumption for the second products or services associated with a non-opt-in subset of the plurality of subscriber followers, to obtain an estimate of an economic value of the second products or services consumed by the plurality of subscriber followers as influenced by the consumption choices of the subscriber leader, based on the correlation;

obtaining a marketable value of the subscriber leader in accordance with the assessing, wherein the marketable value comprises a plurality of market sector values corresponding to predefined market sector characteristics of the second products or services;

performing scanning of the webpage for malicious programs by scanning data in the webpage to detect computer malware and performing monitoring of network activities, over the network, associated with the subscriber leader for unauthorized access to computer resources by detecting for certain data indicative of computer hacking activities;

deriving a reputational value for the subscriber leader based on the scanning of the webpage for malicious programs and based on the performing the monitoring of the network activities for unauthorized access to computer resources; and controlling the access by the third-party system to the subscriber leader based on the reputational value, such that, if the reputational value derived based on the scanning and based on the performing the monitoring indicates that the subscriber leader is conducting illicit activities on the communication system, the access to the subscriber leader for placement of particular content in media content of the webpage generated by the subscriber leader is prohibited and the subscriber leader is prevented from engaging in particular activities associated with the third-party system, wherein prohibiting the access to the subscriber leader comprises preventing the media content of the webpage from being accessed and utilized for the placement of the particular content.

13. The device of claim 12, wherein the products or services are distributed over a communication system by a media service provider.

14. The device of claim 12, wherein the operations further comprise determining from the plurality of subscriber followers a leader attribute comprising a total number of the plurality of subscriber followers or a rate of growth of the plurality of subscriber followers.

15. The device of claim 14, wherein the marketable value of the subscriber leader is determined in part according to the leader attribute.

16. The device of claim 12, wherein the plurality of subscriber followers is identified in accordance with particular website traffic over the network between the subscriber leader and the plurality of subscriber followers.

17. A non-transitory machine-readable medium comprising instructions which, when executed by a processing system including a processor, facilitate performance of operations, the operations comprising:

identifying, from a plurality of subscribers to services of a communication system, a subscriber leader who performs activities associated on a webpage associated with the subscriber leader, wherein the subscriber leader is identified in accordance with website traffic carried electronically via a network, and wherein the website traffic carried electronically via the network is identified electronically by the processing system;

determining, through direct interest expressed by a subset of the plurality of subscribers by establishing a user account on the webpage associated with the subscriber leader, that the subset of the plurality of subscribers is a plurality of subscriber followers of the subscriber leader, wherein the determining is further based on detection, over the network, of social media traffic corresponding to interactions associated with the subscriber leader and the subset of the plurality of subscribers;

providing a third-party system with access to the subscriber leader for placement of particular content in media content generated by the subscriber leader;

monitoring consumption of products or services by the subscriber leader and by the plurality of subscriber followers, wherein the products or services are consumed by the subscriber leader and by an opt-in subset of the plurality of subscriber followers, wherein the opt-in subset is in accordance with an opt-in procedure performed at respective communication devices of the subscriber followers in the opt-in subset to permit the monitoring, each of the communication devices including an interface for communicating with the processing system to perform the opt-in procedure;

identifying first products or services consumed by the subscriber leader;

identifying second products or services consumed by the opt-in subset of the plurality of subscriber followers;

determining a correlation between the first products or services consumed by the subscriber leader and the second products or services consumed by the opt-in subset of the plurality of subscriber followers;

estimating an influence of consumption choices of the subscriber leader over consumption patterns of the opt-in subset of the plurality of subscriber followers, in accordance with the correlation;

assessing a first value of consumption for the second products or services consumed by the opt-in subset of the plurality of subscriber followers and a second value of consumption for the second products or services associated with a non-opt-in subset of the plurality of subscriber followers, to obtain an estimate of an economic value of the second products or services consumed by the plurality of subscriber followers as influenced by the consumption choices of the subscriber leader, based on the correlation;

calculating a marketable value of the subscriber leader based at least in part on the assessing, wherein the marketable value comprises a plurality of market sector values corresponding to predefined market sector characteristics of the second products or services;

performing scanning of the webpage for malicious programs by scanning data in the webpage to detect computer malware and performing monitoring of network activities, over the network, associated with the subscriber leader for unauthorized access to computer resources by detecting for certain data indicative of computer hacking activities;

deriving a reputational value for the subscriber leader based on the scanning of the webpage for malicious programs and based on the performing the monitoring of the network activities for unauthorized access to computer resources; and controlling the access by the third-party system to the subscriber leader based on the reputational value, such that, if the reputational value derived based on the scanning and based on the performing the monitoring indicates that the subscriber leader is conducting illicit activities on the communication system, the access to the subscriber leader for placement of particular content in media content of the webpage generated by the subscriber leader is prohibited and the subscriber leader is prevented from engaging in particular activities associated with the third-party system, wherein prohibiting the access to the subscriber leader comprises preventing the media content of the webpage from being accessed and utilized for the placement of the particular content.

18. The non-transitory machine-readable medium of claim 17, wherein the products or services are distributed over a communication system by a media service provider.

19. The non-transitory machine-readable medium of claim 17, wherein the operations further comprise determining from the plurality of subscriber followers a leader attribute comprising a total number of the plurality of subscriber followers or a rate of growth of the plurality of subscriber followers, wherein the marketable value of the subscriber leader is determined in part according to the leader attribute.

20. The non-transitory machine-readable medium of claim 17, wherein the plurality of subscriber followers is identified in accordance with particular website traffic over the network between the subscriber leader and the plurality of subscriber followers.

\* \* \* \* \*